(12) United States Patent
Coscarella

(10) Patent No.: US 8,096,318 B2
(45) Date of Patent: Jan. 17, 2012

(54) VALVE FLAP FOR A PLUMBING VALVE

(76) Inventor: Gabe Coscarella, Edmonton (CA)

( * ) Notice: Subject to any disclaimer, the term of this patent is extended or adjusted under 35 U.S.C. 154(b) by 862 days.

(21) Appl. No.: 12/111,920

(22) Filed: Apr. 29, 2008

(65) Prior Publication Data

US 2008/0196775 A1    Aug. 21, 2008

(30) Foreign Application Priority Data

Feb. 28, 2006    (CA) ...................................... 2539133

(51) Int. Cl.
*F16K 15/03*    (2006.01)
(52) U.S. Cl. ...................... 137/527.8; 137/527; 4/255.01
(58) Field of Classification Search ............. 137/247.19, 137/527, 527.8; 4/255.01; 15/104.33
See application file for complete search history.

(56) References Cited

U.S. PATENT DOCUMENTS

| | | | | |
|---|---|---|---|---|
| 197,838 | A | * | 12/1877 | Downey ...................... 137/527.8 |
| 222,389 | A | * | 12/1879 | Earle ........................... 137/527.8 |
| 373,782 | A | * | 11/1887 | McHugh ..................... 137/527.8 |
| 566,110 | A | | 8/1896 | Wrigley |
| 745,742 | A | * | 12/1903 | Taube .......................... 137/527.8 |
| 1,104,806 | A | * | 7/1914 | Kahn ........................... 137/527.8 |
| 1,205,199 | A | | 11/1916 | Healy |
| 1,864,443 | A | | 7/1932 | Khun |
| 2,259,128 | A | * | 10/1941 | Egan ............................ 137/527.8 |
| 3,720,225 | A | | 3/1973 | Wheatley, Jr. |
| 3,726,308 | A | * | 4/1973 | Eberhardt ................... 137/527.8 |
| 4,063,570 | A | | 12/1977 | Mitchell |
| 4,095,615 | A | | 6/1978 | Ramsauer |
| 4,266,569 | A | | 5/1981 | Wilson |
| 4,503,881 | A | | 3/1985 | Vecchio |
| RE32,870 | E | | 2/1989 | Houston, Jr. |
| 4,852,605 | A | | 8/1989 | Gouhier |
| 4,917,147 | A | | 4/1990 | Jerkins |
| 5,020,567 | A | | 6/1991 | Proulx |
| 5,031,659 | A | | 7/1991 | Gonzales |
| 5,165,655 | A | | 11/1992 | Drexel |
| 5,406,972 | A | | 4/1995 | Coscarella |
| 5,779,223 | A | | 7/1998 | Marbach |
| 5,785,297 | A | | 7/1998 | Ha |
| 5,826,609 | A | | 10/1998 | Watts |
| 6,029,684 | A | | 2/2000 | Watts |
| 6,192,926 | B1 | | 2/2001 | Bueno Lopez |
| 6,318,404 | B2 | | 11/2001 | Coscarella |
| 6,446,665 | B2 | | 9/2002 | Coscarella |
| 6,679,283 | B1 | | 1/2004 | Coscarella |
| 2001/0035648 | A1 | | 11/2001 | Coscarella |
| 2004/0250863 | A1 | | 12/2004 | Atkeson |

FOREIGN PATENT DOCUMENTS

CA        2568098 A1    4/2008

* cited by examiner

*Primary Examiner* — John Rivell
(74) *Attorney, Agent, or Firm* — Christensen O'Connor Johnson Kindness PLLC

(57) ABSTRACT

A valve flap for a plumbing valve, includes a body having a first face, a second face, a top and a bottom. A pivotal mounting is provided in the vicinity of the top. A curved lower snake deflecting contact face is provided in the vicinity of the bottom, adapted to facilitate sliding contact with a plumbing snake. This valve flap enables a plumbing snake to be inserted into and withdrawn from the plumbing valve.

3 Claims, 3 Drawing Sheets

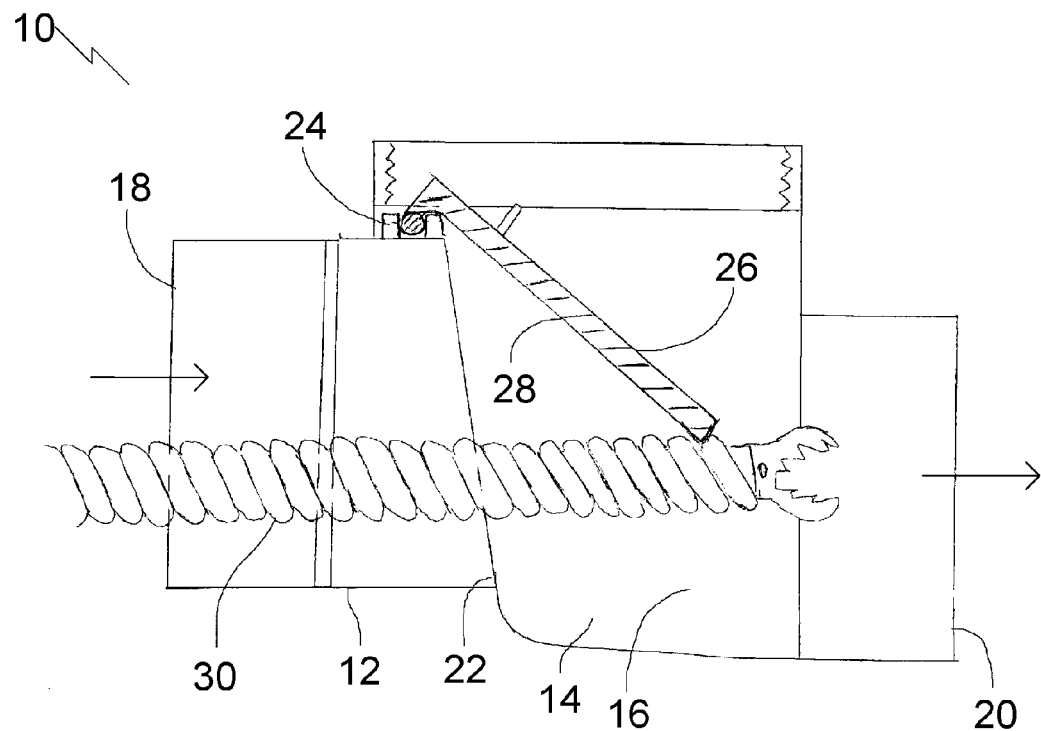
PRIOR ART - FIG. 2
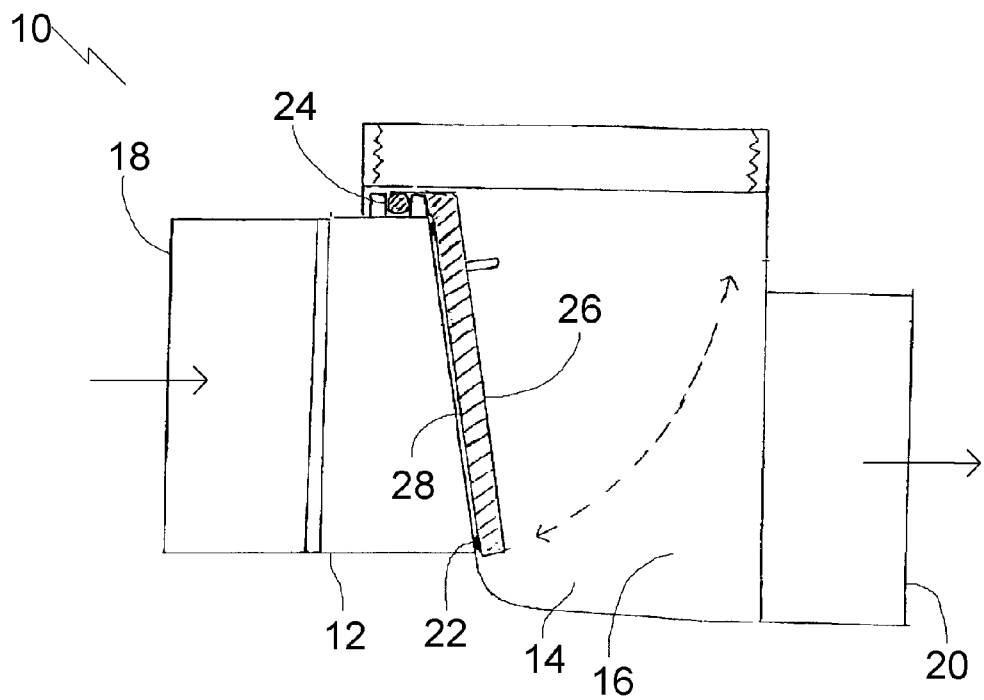
PRIOR ART - FIG. 3

VALVE FLAP FOR A PLUMBING VALVE

FIELD OF THE INVENTION

The present invention relates to a valve flap for a plumbing valve that closes a flow passage with a pivoting valve flap, and a plumbing valve with a valve flap constructed in accordance with the teachings of the present invention.

BACKGROUND OF THE INVENTION

U.S. Pat. No. 4,063,570 (Mitchell et al. 1977) is an example of a plumbing valve. This plumbing valve has a valve flap which pivots away from a seat to allow flow in one direction, but engages the seat to prevent flow in the opposite direction. U.S. Pat. No. 566,110 (Wrigley 1896) is an early version of a cleaning device used for plumbing installations, which has come to be known as a "plumbing snake". A plumbing snake would not normally be used on plumbing lines having a plumbing valve, such as disclosed in the Mitchell et al reference. The valve flap pivots away from the seat to allow the plumbing snake to be inserted, but pivots back toward the seat, wedging the plumbing snake against the seat of the plumbing valve and preventing it from being withdrawn.

SUMMARY OF THE INVENTION

According to the present invention there is provided a valve flap for a plumbing valve, which includes a body having a first face, a second face, a top and a bottom. A pivotal mounting is provided in the vicinity of the top. A curved lower snake deflecting contact face is provided in the vicinity of the bottom, adapted to facilitate sliding contact with a plumbing snake.

The valve flap described above, when positioned in a plumbing valve, enables a plumbing snake to be inserted and withdrawn without interference.

BRIEF DESCRIPTION OF THE DRAWINGS

These and other features of the invention will become more apparent from the following description in which reference is made to the appended drawings, the drawings are for the purpose of illustration only and are not intended to in any way limit the scope of the invention to the particular embodiment or embodiments shown, wherein:

FIG. 2, labelled as PRIOR ART is a side elevation view, in section, of a plumbing valve equipped with a standard valve flap.

FIG. 3 labelled as PRIOR ART is a side elevation view, in section, of plumbing valve illustrated in FIG. 2, used with a plumbing snake.

DETAILED DESCRIPTION OF THE PREFERRED EMBODIMENT

Figure 1:
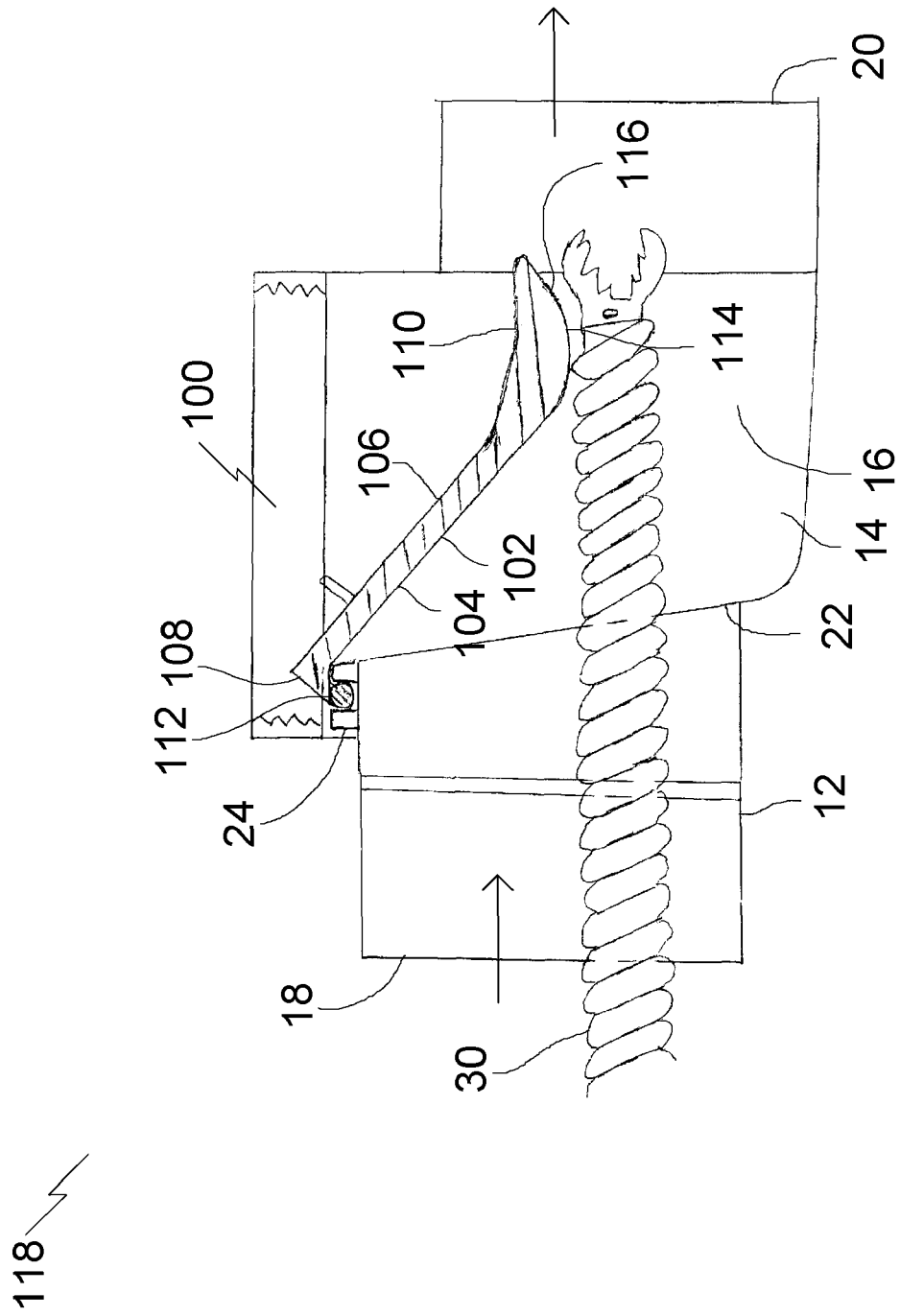
FIG. 1 is a side elevation view, in section, of a plumbing valve equipped with a valve flap constructed in accordance with the teachings of the present invention.

The preferred embodiment, a valve flap for a plumbing valve generally identified by reference numeral 100, will be described with reference to FIG. 1.

Prior Art

Referring to FIG. 2, there will first be described prior art plumbing valve 10. Plumbing valve 10 has a hollow body 12 with an interior 14 defining a flow passage 16 having an inlet end 18 and an outlet end 20. A valve seat 22 is positioned transversely to, and surrounds, flow passage 16. A valve flap receiver 24 is positioned within interior 14 of body 12 above valve seat 22. A valve flap 26 engages valve flap receiver 24. Valve flap 26 is oriented with a first face 28 facing inlet end 18 of flow passage 16. Valve flap 26 pivots away from valve seat 22 to allow flow in one direction, but engages seat 22 to prevent flow in the opposite direction.

Referring to FIG. 3, valve flap 26 pivots away from valve seat 22 to allow a plumbing snake 30 to be inserted, but pivots back toward seat 22, wedging plumbing snake 30 against seat 22 of plumbing valve 10 and preventing it from being withdrawn.

Structure and Relationship of Parts:

Referring to FIG. 1, valve flap 100 has a plate-form body 102 having a first face 104, a second face 106, a top 108 and a bottom 110. There is a pivotal mounting 112 in the vicinity of top 108, and a sliding contact shoe 114 at bottom 110. Sliding contact shoe 114 is adapted to facilitate sliding contact with a plumbing snake 30, as it extends past second face 106 and has a curved lower contact face 116.

Operation:

The use of valve flap 100 with a plumbing valve generally indicated by reference numeral 118 that allows the use of a plumbing snake 30 will now be described. Plumbing valve 10 has hollow body 12 with interior 14 defining flow passage 16 having inlet end 18 and outlet end 20. Valve seat 22 is positioned transversely to, and surrounds, flow passage 16. Valve flap receiver 24 is positioned within interior 14 of body 12 above valve seat 22, and is engaged by valve flap 100. Valve flap 100 is provided as describe above. Valve flap 100 is oriented with first face 104 facing inlet end 18 of flow passage 16 and sliding contact shoe 114 pointing toward outlet end 20. Valve flap 100 pivots away from valve seat 22 when plumbing snake 30 is inserted. When plumbing snake 30 is then withdrawn, plumbing snake 30 slides along curved lower contact face 116 of sliding contact shoe 114.

Figure 4:
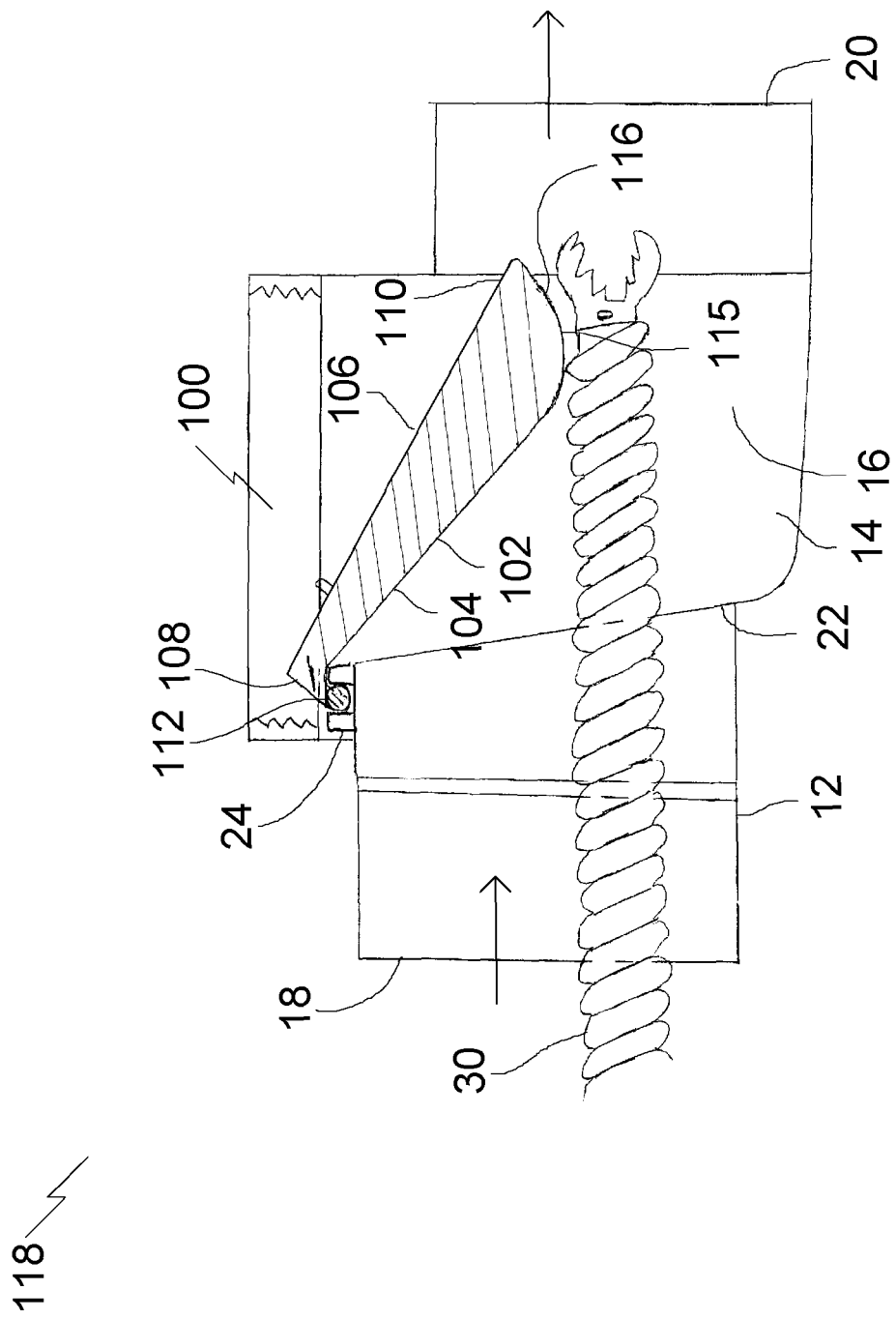
FIG. 4 is a side elevation view, in section of a variation of the plumbing valve depicted in FIG. 1.

Variation:

While the preferred embodiment of valve flap 100 shown in FIG. 1 includes a contact shoe 114 that extends past second face 106, it will be understood that this is not the only way of constructing valve flap 100. Referring to FIG. 4, it can be seen that the important feature is curved lower snake deflecting contact face 115 located in the vicinity of bottom 110 that is adapted to facilitate sliding contact with plumbing snake 30. Curved lower snake deflecting contact face 115 does not have to be part of a contact shoe 114. Thus, valve flap 100 may take any shape that allows it to act as a valve flap and incorporate curved lower snake deflecting contact face 115. In the embodiment illustrated in FIG. 4, an equivalent supporting surface to that provided by contact shoe 114 has been created by increasing the thickness of valve flap 110.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

It will be apparent to one skilled in the art that modifications may be made to the illustrated embodiment without departing from the spirit and scope of the invention as hereinafter defined in the Claims.

What is claimed is:

1. A valve flap for a plumbing valve, comprising:

a body having a first face, a second face, a top, and a bottom;

a pivotal mounting in the vicinity of the top; and a curved lower snake deflecting contact face in the vicinity of the bottom adapted to facilitate sliding contact with a plumbing snake, the contact face curving toward the second face and the second face angling outward relative to the first face and terminating at the contact face.

2. A plumbing valve for use with a plumbing snake, comprising:

a hollow body having an interior defining a flow passage having an inlet end and an outlet end;

a valve seat positioned transversely to and surrounding the flow passage;

a valve flap receiver positioned within the interior of the body above the valve seat; and a valve flap engaging the valve flap receiver, the valve flap comprising:

a body having a first face, a second face, a top and a bottom;

a pivotal mounting in the vicinity of the top which is adapted to engage the valve flap receiver; and a curved lower snake deflecting contact face in the vicinity of the bottom adapted to facilitate sliding contact with a plumbing snake, the contact face curving toward the second face and the second face angling outward relative to the first face and terminating at the contact face;

the valve flap being oriented with the first face facing the inlet end of the flow passage and engaging the valve seat such that the valve flap pivots away from the valve seat to permit insertion of a plumbing snake and when being withdrawn, the plumbing snake slides along the curved lower contact face.

3. A plumbing valve for use with a plumbing snake, comprising:

a hollow body having an interior defining a flow passage having an inlet end and an outlet end;

a valve seat positioned transversely to and surrounding the flow passage;

a valve flap receiver positioned within the interior of the body above the valve seat; and a valve flap engaging the valve flap receiver, the valve flap comprising:

a plate-form body having a first face, a second face, a top and a bottom;

a pivotal mounting in the vicinity of the top which is adapted to engage the valve flap receiver; and a sliding contact shoe at the bottom, the sliding contact shoe curving toward the second face and the second face angling outward relative to the first face and terminating at the sliding contact shoe;

the valve flap being oriented with the first face facing the inlet end of the flow passage and engaging the valve seat and the sliding contact shoe pointing toward the outlet end such that the valve flap pivots away from the valve seat to permit insertion of a plumbing snake and when being withdrawn, the plumbing snake slides along the curved lower snake deflecting contact face of the sliding contact shoe.

* * * * *